United States Patent
Dubois et al.

(10) Patent No.: US 10,559,850 B2
(45) Date of Patent: *Feb. 11, 2020

(54) NONAQUEOUS ELECTROLYTE COMPOSITIONS COMPRISING CYCLIC SULFATES

(71) Applicant: Solvay SA, Brussels (BE)

(72) Inventors: Charles J. Dubois, Orange, TX (US); Kostantinos Kourtakis, Media, PA (US); Jun J. Liu, Wilmington, DE (US); Mark Gerrit Roelofs, Earleville, MD (US)

(73) Assignee: Solvay SA, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/311,330

(22) PCT Filed: May 14, 2015

(86) PCT No.: PCT/US2015/030785
§ 371 (c)(1),
(2) Date: Nov. 15, 2016

(87) PCT Pub. No.: WO2015/179205
PCT Pub. Date: Nov. 26, 2015

(65) Prior Publication Data
US 2017/0084951 A1    Mar. 23, 2017

Related U.S. Application Data

(60) Provisional application No. 62/002,343, filed on May 23, 2014, provisional application No. 62/020,080, filed on Jul. 2, 2014.

(51) Int. Cl.
| | | |
|---|---|---|
| H01M 10/0567 | (2010.01) |
| H01M 10/0569 | (2010.01) |
| H01M 10/0525 | (2010.01) |
| H01M 4/485 | (2010.01) |
| H01M 4/50 | (2010.01) |
| H01M 4/525 | (2010.01) |
| H01M 4/505 | (2010.01) |

(52) U.S. Cl.
CPC ....... *H01M 10/0567* (2013.01); *H01M 4/485* (2013.01); *H01M 4/505* (2013.01); *H01M 4/525* (2013.01); *H01M 10/0525* (2013.01); *H01M 10/0569* (2013.01); *H01M 2300/0034* (2013.01); *H01M 2300/0037* (2013.01)

(58) Field of Classification Search
CPC .... H01M 4/1315; H01M 4/485; H01M 4/505; H01M 4/525; H01M 4/583; H01M 10/0525; H01M 10/0567; H01M 10/0568; H01M 10/0569; H01M 2300/0034; H01M 2300/0037; H01M 2220/20; H01M 2220/30

See application file for complete search history.

(56) References Cited

U.S. PATENT DOCUMENTS

| | | |
|---|---|---|
| 5,738,957 A | 4/1998 | Amine et al. |
| 5,962,166 A | 10/1999 | Ein-Eli et al. |
| 6,680,145 B2 | 1/2004 | Obrovac et al. |
| 6,964,828 B2 | 11/2005 | Lu et al. |
| 7,026,070 B2 | 4/2006 | Noguchi et al. |
| 7,078,128 B2 | 7/2006 | Lu et al. |
| 7,303,840 B2 | 12/2007 | Thackeray et al. |
| 7,381,496 B2 | 6/2008 | Onnerud et al. |
| 7,468,223 B2 | 12/2008 | Thackeray et al. |
| 7,541,114 B2 | 6/2009 | Ohzuku et al. |
| 7,718,319 B2 | 5/2010 | Manthiram et al. |
| 7,981,554 B2 | 7/2011 | Sato et al. |
| 8,389,160 B2 | 3/2013 | Venkatachalam et al. |
| 8,394,534 B2 | 3/2013 | Lopez et al. |
| 8,518,525 B2 | 8/2013 | Dennes et al. |

(Continued)

FOREIGN PATENT DOCUMENTS

| | | |
|---|---|---|
| EP | 2 571 089 A1 | 3/2013 |
| WO | 2009/040367 A1 | 4/2009 |

(Continued)

OTHER PUBLICATIONS

PCT International Search Report and Written Opinion dated Jul. 16, 2015, issued by the European Patent Office in corresponding International Application No. PCT/US2015/030785 (11 pages).

PCT International Preliminary Report on Patentability dated Nov. 29, 2016, issued by the International Bureau of WIPO in corresponding International Application No. PCT/US2015/030785 (8 pages).

Yoon, Sukeun, et al., "Sb-MOx-C (M=Al, Ti, or Mo) Nanocomposite Anodes for Lithium-Ion Batteries"; Chemistry of Materials, 2009, 21; pp. 3898-3904; DOI: 10.1021/cm901495h.

Liu, Jun, et al., "Understanding the Improved Electrochemical Performances of Fe-Substituted 5 V Spinel Cathode LiMn1.5Ni0.5O4;" J. Phys. Chem. C 2009, 113; pp. 15073-15079.

(Continued)

*Primary Examiner* — Anca Eoff
(74) *Attorney, Agent, or Firm* — Osha Liang LLP

(57) ABSTRACT

Described herein are electrolyte compositions containing an organic carbonate, a fluorinated solvent, a cyclic sulfate, and at least one electrolyte salt. The cyclic sulfate can be represented by the formula:

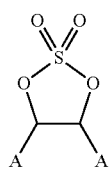

wherein each A is independently a hydrogen or an optionally fluorinated vinyl, allyl, acetylenic, propargyl, or $C_1$-$C_3$ alkyl group. The electrolyte compositions are useful in electrochemical cells, such as lithium ion batteries.

17 Claims, No Drawings

(56) References Cited

U.S. PATENT DOCUMENTS

| | | | |
|---|---|---|---|
| 8,535,832 B2 | 9/2013 | Karthikeyan et al. | |
| 10,205,192 B2* | 2/2019 | Dubois | H01M 4/485 |
| 2005/0266313 A1* | 12/2005 | Kitao | H01M 4/364 |
| | | | 429/231.1 |
| 2006/0051671 A1 | 3/2006 | Thackeray et al. | |
| 2007/0224504 A1* | 9/2007 | Kita | H01M 4/131 |
| | | | 429/231.1 |
| 2010/0119881 A1* | 5/2010 | Patel | H01M 2/34 |
| | | | 429/7 |
| 2014/0134501 A1* | 5/2014 | Li | H01M 10/052 |
| | | | 429/339 |
| 2015/0079463 A1* | 3/2015 | Yamamoto | H01M 4/505 |
| | | | 429/188 |
| 2017/0117586 A1* | 4/2017 | Dubois | H01M 10/0569 |

FOREIGN PATENT DOCUMENTS

| | | | |
|---|---|---|---|
| WO | 2013/033595 A1 | | 3/2013 |
| WO | WO 2013/033595 | * | 3/2013 |
| WO | WO 2013/161445 | * | 10/2013 |

OTHER PUBLICATIONS

Schmitz, Raphael W., et al., "Investigations on novel electrolytes, solvents and SEI additives for use in lithium-ion batteries: Systematic electrochemical characterization and detailed analysis by spectroscopic methods;" Progress in Solid State Chemistry, 42 (2014) pp. 65-84.

* cited by examiner

NONAQUEOUS ELECTROLYTE COMPOSITIONS COMPRISING CYCLIC SULFATES

CROSS REFERENCE TO RELATED APPLICATIONS

This application claims the benefit of priority of U.S. Provisional Application No. 62/002,343, filed on May 23, 2014, and 62/020,080, filed on Jul. 2, 2014, both of which are herein incorporated by reference in their entirety.

FIELD OF DISCLOSURE

The disclosure herein relates to electrolyte compositions containing an organic carbonate, a fluorinated solvent, and a cyclic sulfate, which are useful in electrochemical cells, such as lithium ion batteries.

BACKGROUND

Carbonate compounds are currently used as electrolyte solvents for non-aqueous batteries containing electrodes made from alkali metals, alkaline earth metals, or compounds comprising these metals, for example lithium ion batteries. Current lithium ion battery electrolyte solvents typically contain one or more linear carbonates, such as ethyl methyl carbonate, dimethyl carbonate, or diethyl carbonate; and a cyclic carbonate, such as ethylene carbonate. However, at cathode potentials above 4.35 V these electrolyte solvents can decompose, which can result in a loss of battery performance.

Various approaches have been investigated to overcome the limitations of commonly used non-aqueous electrolyte solvents. Although these electrolyte solvents can be used in lithium ion batteries having high potential cathodes, specifically at voltages greater than about 4.35 V, such as $LiCoO_2$ or $LiNi_xMn_yCo_zO_2$ where x+y+z is about 1, charged to cathode potentials higher than the standard 4.1 to 4.25 V range in order to access higher capacity, cycling performance can be limited, particularly at high temperatures.

A need remains for electrolyte solvents, and compositions thereof, that will have improved performance at high temperature when used in a lithium ion battery, particularly such a battery that operates with a high potential cathode (i.e. up to about 5 V).

SUMMARY

In one embodiment, there is provided herein an electrolyte composition comprising:
a) an organic carbonate;
b) a fluorinated solvent;
c) a cyclic sulfate represented by the formula:

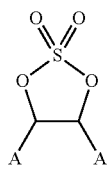

wherein each A is independently a hydrogen or an optionally fluorinated vinyl, allyl, acetylenic, propargyl, or $C_1$-$C_3$ alkyl group; and
d) at least one electrolyte salt.

In one embodiment the organic carbonate is a non-fluorinated carbonate. In one embodiment, the organic carbonate is a fluorinated carbonate.

In one embodiment, the fluorinated solvent is at least one fluorinated solvent selected from fluorinated acyclic carboxylic acid esters, fluorinated acyclic carbonates, and fluorinated acyclic ethers.

In one embodiment, the cyclic sulfate comprises ethylene sulfate.

In another embodiment there is a provided a method to prepare an electrolyte composition comprising combining a), b), c), and d) as defined above, to form an electrolyte composition.

In another embodiment, there is provided herein an electrochemical cell comprising an electrolyte composition disclosed herein.

In a further embodiment, the electrochemical cell is a lithium ion battery.

DETAILED DESCRIPTION

As used above and throughout the disclosure, the following terms, unless otherwise indicated, shall be defined as follows:

The term "electrolyte composition" as used herein, refers to a chemical composition suitable for use as an electrolyte in an electrochemical cell.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

The term "anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

The term "carbonate" as used herein refers specifically to an organic carbonate, wherein the organic carbonate is a dialkyl diester derivative of carbonic acid, the organic carbonate having a general formula: R'OCOOR", wherein R' and R" are each independently selected from alkyl groups having at least one carbon atom, wherein the alkyl substituents can be the same or different, can be saturated or unsaturated, substituted or unsubstituted, can form a cyclic structure via interconnected atoms, or include a cyclic structure as a substituent of either or both of the alkyl groups.

Equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value (Li/Li$^+$). The potential of such a Li/Li+ reference electrode is assigned here the value of 0.0V. Potential of an anode or cathode means the potential difference between the anode or cathode and that of a Li/Li+ reference electrode. Herein voltage means the voltage difference between the cathode and the anode of a cell, neither electrode of which may be operating at a potential of 0.0V.

Disclosed herein are electrolyte compositions comprising:
a) an organic carbonate;
b) a fluorinated solvent;
c) a cyclic sulfate represented by the formula:

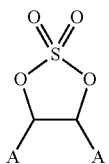

wherein each A is independently a hydrogen or an optionally fluorinated vinyl, allyl, acetylenic, propargyl, or $C_1$-$C_3$ alkyl group; and
d) at least one electrolyte salt.

As used herein, the terms "organic carbonate" and "fluorinated solvent" refer to different, that is, not the same, chemical compounds of the electrolyte composition.

One or more organic carbonates may be used in the electrolyte composition. Suitable organic carbonates include fluoroethylene carbonate, ethylene carbonate, ethyl methyl carbonate, 4,4-difluoroethylene carbonate, 1, 3-dioxolan-2-one, 4,5-difluoro-, (4R,5S)-rel-, 1,3-dioxolan-2-one, 4,5-difluoro-, (4R,5R)-rel-, trifluoroethylene carbonate, tetrafluoroethylene carbonate, dimethyl carbonate, diethyl carbonate, propylene carbonate, vinylene carbonate, di-tert-butyl carbonate, 2,2,3,3-tetrafluoropropyl methyl carbonate, bis(2,2,3,3-tetrafluoropropyl) carbonate, bis(2,2,2-trifluoroethyl) carbonate, 2,2,2-trifluoroethyl methyl carbonate, bis (2,2-difluoroethyl) carbonate, 2,2-difluoroethyl methyl carbonate, dipropyl carbonate, methyl propyl carbonate, ethyl propyl vinylene carbonate, methyl butyl carbonate, ethyl butyl carbonate, propyl butyl carbonate, dibutyl carbonate, vinylethylene carbonate, dimethylvinylene carbonate, 2,3,3-trifluoroallyl methyl carbonate, or mixtures thereof.

In one embodiment the organic carbonate is a non-fluorinated carbonate. One or more non-fluorinated carbonates may be used in the electrolyte composition. Suitable non-fluorinated carbonates include ethylene carbonate, ethyl methyl carbonate, dimethyl carbonate, diethyl carbonate, propylene carbonate, vinylene carbonate, di-tert-butyl carbonate, vinylethylene carbonate, dimethylvinylene carbonate, dipropyl carbonate, methyl propyl carbonate, ethyl propyl vinylene carbonate, methyl butyl carbonate, ethyl butyl carbonate, propyl butyl carbonate, dibutyl carbonate, vinylethylene carbonate, dimethylvinylene carbonate, or mixtures thereof. In one embodiment, the non-fluorinated carbonate is ethylene carbonate, ethyl methyl carbonate, dimethyl carbonate, diethyl carbonate, propylene carbonate, or mixtures thereof.

In another embodiment the organic carbonate is fluorinated. One or more fluorinated carbonates may be used in the electrolyte composition. Suitable fluorinated carbonates include fluoroethylene carbonate; 4,4-difluoroethylene carbonate, 1,3-dioxolan-2-one, 4,5-difluoro-, (4R,5S)-rel-, 1, 3-dioxolan-2-one, 4,5-difluoro-, (4R,5R)-rel-, trifluoroethylene carbonate; trifluoroethylene carbonate; tetrafluoroethylene carbonate; 2,2,3,3-tetrafluoropropyl methyl carbonate; bis(2,2,3,3-tetrafluoropropyl) carbonate; bis(2,2,2-trifluoroethyl) carbonate; 2,2,2-trifluoroethyl methyl carbonate; bis (2,2-difluoroethyl) carbonate; 2,2-difluoroethyl methyl carbonate; 2,3,3-trifluoroallyl methyl carbonate; or mixtures thereof. In one embodiment, the organic carbonate is fluoroethylene carbonate, which is also known as 4-fluoro-1,3-dioxolan-2-one. In one embodiment, the organic carbonate comprises 4,5-difluoro-1,3-dioxolan-2-one, 4,5-difluoro-4-methyl-1,3-dioxolan-2-one, 4,5-difluoro-4,5-dimethyl-1,3-dioxolan-2-one, 4,4-difluoro-1,3-dioxolan-2-one, 4,4,5-trifluoro-1,3-dioxolan-2-one, or mixtures thereof.

In another embodiment, the organic carbonate comprises one or more non-fluorinated carbonates and one or more fluorinated carbonates.

In another embodiment, the organic carbonate is non-fluorinated, and the electrolyte composition does not include a fluorinated carbonate, except wherein the fluorinated solvent includes a fluorinated acyclic carbonate $R^3$—OCOO—$R^4$ as defined herein below.

In the electrolyte compositions disclosed herein, the organic carbonate or mixtures thereof can be used in various amounts depending on the desired properties of the electrolyte composition. In one embodiment, the organic carbonate(s) in combination comprises about 0.5% to about 95% by weight of the electrolyte composition, or about 5% to about 95%, or about 10% to about 80% by weight of the electrolyte composition, or about 20% to about 40% by weight of the electrolyte composition, or about 25% to about 35% by weight of the electrolyte composition. In another embodiment, the organic carbonate(s) comprises about 0.5% to about 10% by weight of the electrolyte composition, or about 1% to about 10%, or about 5% to about 10%.

One or more fluorinated solvents may be used in the electrolyte composition. The fluorinated solvent is at least one fluorinated solvent selected from fluorinated acyclic carboxylic acid esters, fluorinated acyclic carbonates, and fluorinated acyclic ethers. More specifically, the fluorinated solvent is:

a) a fluorinated acyclic carboxylic acid ester represented by the formula:

$R^1$—COO—$R^2$, b) a fluorinated acyclic carbonate represented by the formula:

$R^3$—OCOO—$R^4$, c) a fluorinated acyclic ether represented by the formula:

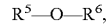
$R^5$—O—$R^6$, or a mixture thereof;
wherein $R^1$, $R^2$, $R^3$, $R^4$, $R^5$, and $R^6$ each independently represent an alkyl group; the sum of carbon atoms in any of $R^1$ and $R^2$, $R^3$ and $R^4$, and $R^5$ and $R^6$ is 2 to 7; at least two hydrogens in $R^1$ and/or $R^2$, $R^3$ and/or $R^4$, and $R^5$ and/or $R^6$ are replaced by fluorines; and neither $R_1$, $R_2$, $R_3$, $R_4$, $R_5$, nor $R_6$ contains a —$CH_2F$ or —CHF— group.

Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), $F_2CHCH_2$—COO—$CH_3$, $F_2CHCH_2$—COO—$CH_2CH_3$, and $F_2CHCH_2CH_2$—COO—$CH_2CH_3$ (ethyl 4,4-difluorobutanoate, CAS No. 1240725-43-2). In one embodiment, the fluorinated acyclic carboxylic acid ester is 2,2-difluoroethyl acetate ($CH_3$—COO—$CH_2CF_2H$).

In one embodiment, the number of carbon atoms in $R^1$ in the formula above is 1, 3, 4, or 5.

In another embodiment, the number of carbon atoms in $R^1$ in the formula above is 1.

In another embodiment, $R^1$ and $R^3$ in the formula above do not contain fluorine, and $R^2$ and $R^4$ contain fluorine.

Suitable fluorinated acyclic carbonates are represented by the formula $R^3$—OCOO—$R^4$, where $R^3$ and $R^4$ independently represent a linear or branched alkyl group, the sum of carbon atoms in $R^3$ and $R^4$ is 2 to 7, at least two hydrogens in $R^3$ and/or $R^4$ are replaced by fluorines (that is, at least two hydrogens in $R^3$ are replaced by fluorines, or at least two hydrogens in $R^4$ are replaced by fluorines, or at least two hydrogens in $R^3$ and at least two hydrogens in $R^4$ are replaced by fluorines), and neither $R^3$ nor $R^4$ contains a $FCH_2$ or FCH group. Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No. 156783-98-1), $HCF_2CH_2$—OCOO—$CH_2CH_3$ (ethyl 2,2-difluoroethyl carbonate, CAS No. 916678-14-3), and $CF_3CH_2$—OCOO—$CH_2CH_3$ (ethyl 2,2,2-trifluoroethyl carbonate, CAS No. 156783-96-9).

Suitable fluorinated acyclic ethers are represented by the formula: $R^5$—O—$R^6$, where $R^5$ and $R^6$ independently represent a linear or branched alkyl group, the sum of carbon atoms in $R^5$ and $R^6$ is 2 to 7, at least two hydrogens in $R^5$ and/or $R^6$ (that is, at least two hydrogens in $R^5$ are replaced by fluorines, or at least two hydrogens in $R^6$ are replaced by fluorines, or at least hydrogens in $R^5$ are replaced by fluorines and at least two hydrogens in $R^6$ are replaced by fluorines), are replaced by fluorines and neither $R^5$ nor $R^6$ contains a $FCH_2$ or FCH group. Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

A mixture of two or more of these fluorinated acyclic carboxylic acid ester, fluorinated acyclic carbonate, and/or fluorinated acyclic ether solvents may also be used. A non-limiting example is a mixture of 2,2-difluoroethyl acetate and 2,2-difluoroethyl propionate, or a mixture of 2,2-difluoroethyl acetate and 2,2-difluoroethyl methyl carbonate.

In the electrolyte compositions disclosed herein, the fluorinated solvent or mixtures thereof can be used in various amounts depending on the desired properties of the electrolyte composition. In one embodiment, the fluorinated solvent comprises about 5% to about 95% by weight of the electrolyte composition. In another embodiment, the fluorinated solvent comprises about 10% to about 80% by weight of the electrolyte composition. In another embodiment, the fluorinated solvent comprises about 30% to about 70% by weight of the electrolyte composition. In another embodiment, the fluorinated solvent comprises about 50% to about 70% by weight of the electrolyte composition. In another embodiment, the fluorinated solvent comprises about 45% to about 65% by weight of the electrolyte composition. In another embodiment, the fluorinated solvent comprises about 6% to about 30% by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of $HCF_2CF_2CH_2$—O—$CF_2CF_2H$ can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—O—$CF_2CF_2H$. Alternatively, some of these fluorinated solvents may be purchased from companies such as Matrix Scientific (Columbia S.C.). For best results, it is desirable to purify the fluorinated acyclic carboxylic esters and fluorinated acyclic carbonates to a purity level of at least about 99.9%, more particularly at least about 99.99%. These fluorinated solvents may be purified using distillation methods such as vacuum distillation or spinning band distillation The electrolyte compositions disclosed herein also comprise a cyclic sulfate represented by the formula:

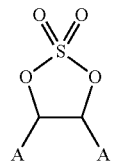

wherein each A is independently a hydrogen or an optionally fluorinated vinyl, allyl, acetylenic, propargyl, or $C_1$-$C_3$ alkyl group. The vinyl ($H_2C$=CH—), allyl ($H_2C$=CH—$CH_2$—), acetylenic (HC≡C—), propargyl (HC≡C—$CH_2$—), or $C_1$-$C_3$ alkyl groups may each be unsubstituted or partially or totally fluorinated. Mixtures of two or more of cyclic sulfates may also be used. Suitable cyclic sulfates include ethylene sulfate (1,3,2-dioxathiolane, 2,2-dioxide), 1,3,2-dioxathiolane, 4-ethynyl-, 2,2-dioxide, 1,3,2-dioxathiolane, 4-ethenyl-, 2,2-dioxide, 1,3,2-dioxathiolane, diethenyl-, 2,2-dioxide, 1,3,2-dioxathiolane, 4-methyl-, 2,2-dioxide, and 1,3,2-dioxathiolane, 4,5-dimethyl-, 2,2-dioxide. In one embodiment, the cyclic sulfate is ethylene sulfate. In one embodiment the cyclic sulfate is present at about 0.1 weight percent to about 12 weight percent of the total electrolyte composition, or about 0.5 weight percent to less than about 10 weight percent, about 0.5 weight percent to less than about 5 weight percent, or about 0.5 weight percent to about 3 weight percent, or about 0.5 weight percent to about 2 weight percent, or about 2 weight percent to about 3 weight percent. In one embodiment the cyclic sulfate is present at about 1 weight percent to about 3 weight percent or about 1.5 weight percent to about 2.5 weight percent, or about 2 weight percent of the total electrolyte composition.

The electrolyte compositions disclosed herein may further comprise at least one lithium borate salt, such as lithium bis(oxalato)borate, lithium difluoro(oxalato)borate, lithium tetrafluoroborate, other lithium borate salts, or mixtures thereof. In one embodiment, the electrolyte compositions additionally comprise at least one lithium borate salt selected from lithium bis(oxalato)borate, lithium difluoro (oxalato)borate, lithium tetrafluoroborate, or mixtures thereof. In some embodiments, the electrolyte composition comprises lithium bis(oxalato)borate. In some embodiments, the electrolyte composition comprises lithium difluoro(oxalato)borate. In some embodiments, the electrolyte composition comprises lithium tetrafluoroborate. The lithium borate salt may be present in the electrolyte composition in the range of from 0.1 to about 10 percent by weight, based on the total weight of the electrolyte composition, for example in the range of from 0.1 to about 5.0 percent by weight, or from 0.3 to about 4.0 percent by weight, or from 0.5 to 2.0 percent by weight.

In one embodiment, the electrolyte composition comprises ethylene carbonate, ethylene sulfate, and 2,2-difluoroethyl acetate.

In some embodiments, the electrolyte composition further comprises lithium bis(oxalato)borate or fluoroethylene carbonate.

The electrolyte compositions disclosed herein also contain at least one electrolyte salt. Suitable electrolyte salts include without limitation lithium hexafluorophosphate (LiPF$_6$), lithium tris(pentafluoroethyl)trifluorophosphate (LiPF$_3$(C$_2$F$_5$)$_3$), lithium bis(trifluoromethanesulfonyl)imide, lithium bis(perfluoroethanesulfonyl)imide, lithium (fluorosulfonyl) (nonafluorobutanesulfonyl)imide, lithium bis(fluorosulfonyl)imide, lithium tetrafluoroborate, lithium perchlorate, lithium hexafluoroarsenate, lithium trifluoromethanesulfonate, lithium tris(trifluoromethanesulfonyl)methide, lithium bis(oxalato)borate, lithium difluoro(oxalato)borate, Li$_2$B$_{12}$F$_{12-x}$H$_x$ where x is equal to 0 to 8, and mixtures of lithium fluoride and anion receptors such as B(OC$_6$F$_5$)$_3$.

Mixtures of two or more of these or comparable electrolyte salts may also be used. In one embodiment, the electrolyte salt is lithium hexafluorophosphate. The electrolyte salt can be present in the electrolyte composition in an amount of about 0.2 to about 2.0 M, more particularly about 0.3 to about 1.5 M, and more particularly about 0.5 to about 1.2 M.

Optionally, the electrolyte compositions disclosed herein can further comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 weight % to about 10 weight %, alternatively from about 0.05 weight % to about 5 weight % of the electrolyte composition, or alternatively from about 0.5 weight % to about 2 weight % of the electrolyte composition.

Suitable gas-reduction additives that are known conventionally include, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-l,2-naphthoquinone; 2-acetylfuran; 2-acetyl-5-methylfuran; 2-methyl imidazole1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone, CF$_3$COO-CH$_2$C(CH$_3$)(CH$_2$OCOCF$_3$)$_2$, CF$_3$COOCH$_2$CF$_2$CF$_2$CF$_2$ CF$_2$ CH$_2$OCOCF$_3$, α-methylene-γ-butyrolactone, 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine 4,5-difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid such as lithium oxalate, B$_2$O$_5$, ZnO, and fluorinated inorganic salts.

In another embodiment, there is provided herein an electrochemical cell comprising a housing, an anode and a cathode disposed in the housing and in ionically conductive contact with one another, an electrolyte composition, as described above, providing an ionically conductive pathway between the anode and the cathode, and a porous or microporous separator between the anode and the cathode. The housing may be any suitable container to house the electrochemical cell components. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, or a combination thereof. The pore size of the porous separator is sufficiently large to permit transport of ions, but small enough to prevent contact of the anode and cathode either directly or from particle penetration or dendrites which can form on the anode and cathode.

In another embodiment, the electrochemical cell is a lithium ion battery. Suitable cathode materials for a lithium ion battery include without limitation electroactive compounds comprising lithium and transition metals, such as $LiCoO_2$, $LiNiO_2$, $LiMn_2O_4Co_{0.2}Ni_{0.2}O_2$ or $LiV_3O_8$, $Li_aCoG_bO_2$ (0.90≤a≤1.8, and 0.001≤b≤0.1);

$Li_aNi_bMn_cCo_dR_eO_2$-$Z_f$ where 0.8≤a≤1.2, 0.1≤b≤0.5, 0.2≤c≤0.7, 0.05≤d≤0.4, 0≤e≤0.2, b+c+d+e is about 1, and 0≤f≤0.08;

$Li_aA_{1-b}R_bD_c$ (0.90≤a≤1.8 and 0≤b≤0.5);

$Li_aE_{1-b}R_bO_{2-c}D_c$ (0.90≤a≤1.8, 0≤b≤0.5 and 0≤c≤0.05);

$Li_aNi_{1-b-c}Co_bR_cO_{2-d}Z_d$ where 0.9≤a≤1.8, 0≤b≤0.4, 0≤c≤0.05, and 0≤d≤0.05;

$Li_{1+z}Ni_{1-x-y}Co_xAl_yO_2$ where 0≤x≤0.3, 0≤y≤0.1, and 0≤z≤0.06;

$LiNi_{0.5}Mn_{1.5}O_4$; $LiFePO_4$, $LiMnPO_4$, $LiCoPO_4$, and $LiVPO_4F$.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166, 6,680,145, 6,964,828, 7,026,070, 7,078,128, 7,303,840, 7,381,496, 7,468,223, 7,541,114, 7,718,319, 7,981,544, 8,389,160, 8,394,534, and 8,535,832, and the references therein. By "rare earth element" is meant the lanthanide elements from La to Lu, and Y and Sc. In another embodiment the cathode material is an NMC cathode; that is, a LiNiMnCoO cathode; more specifically, cathodes in which the atomic ratio of Ni:Mn:Co is 1:1:1 ($Li_aNi_{1-b-c}Co_bR_cO_{2-d}Z_d$ where 0.98≤a≤1.05, 0≤d≤0.05, b=0.333, c=0.333, where R comprises Mn), or where the atomic ratio of Ni:Mn:Co is 5:3:2 ($Li_aNi_{1-b-c}Co_bR_cO_{2-d}Z_d$ where 0.98≤a≤1.05, 0≤d≤0.05, c=0.3, b=0.2, where R comprises Mn).

In another embodiment, the cathode in the lithium ion battery disclosed herein comprises a cathode active material exhibiting greater than 30 mAh/g capacity in the potential range greater than 4.6 V versus a Li/Li+ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode in the lithium battery disclosed herein comprises a composite material represented by the structure of Formula:

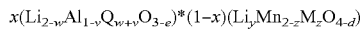

$x(Li_{2-w}Al_{1-v}Q_{w+v}O_{3-e})*(1-x)(Li_yMn_{2-z}M_zO_{4-d})$ wherein:

x is about 0.005 to about 0.1;

A comprises one or more of Mn or Ti,

Q comprises one or more of Al, Ca, Co, Cr, Cu, Fe, Ga, Mg, Nb, Ni, Ti, V, Zn, Zr or Y, e is 0 to about 0.3;

v is 0 to about 0.5.

w is 0 to about 0.6;

M comprises one or more of Al, Ca, Co, Cr, Cu, Fe, Ga, Li, Mg, Mn, Nb, Ni, Si, Ti, V, Zn, Zr or Y, d is 0 to about 0.5;

y is about 0 to about 1; and z is about 0.3 to about 1; and wherein the $Li_yMn_{2-z}M_zO_{4-d}$ component has a spinel structure and the $Li_{2-w}Q_{w+v}A_{1-v}O_{3-e}$ component has a layered structure.

In another embodiment, the cathode in the lithium ion battery disclosed herein comprises a cathode active material which is charged to a potential greater than or equal to about 4.1 V, or greater than 4.35 V, or greater than 4.5 V, or greater than 4.6 V versus a Li/Li+ reference electrode. Other examples are layered-layered high-capacity oxygen-release cathodes such as those described in U.S. Pat. No. 7,468,223 charged to upper charging potentials above 4.5 V.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of $LiOH \cdot H_2O$ at about 800 to about 1000° C. in oxygen for 3 to 24 hours. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

A lithium ion battery as disclosed herein further contains an anode, which comprises an anode active material that is capable of storing and releasing lithium ions. Examples of suitable anode active materials include without limitation lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$; nanocomposites containing antimony or tin, for example nanocomposites containing antimony, oxides of aluminum, titanium, or molybdenum, and carbon, such as those described by Yoon et al (*Chem. Mater.* 21, 3898-3904, 2009); and lithium titanates such as $Li_4Ti_5O_{12}$ and $LiTi_2O_4$. In one embodiment, the anode active material is lithium titanate or graphite. In another embodiment, the anode is graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi NEI Inc. (Somerset, N.J.), and Farasis Energy Inc. (Hayward, Calif.).

A lithium ion battery as disclosed herein also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. application Ser. No. 12/963,927 (filed 9 Dec. 2010, U.S. Patent Application Publication No. 2012/0149852, now U.S. Pat. No. 8,518,525).

The housing of the lithium ion battery hereof may be any suitable container to house the lithium ion battery components described above. Such a container may be fabricated in the shape of small or large cylinder, a prismatic case or a pouch.

The lithium ion battery disclosed herein may be used for grid storage or as a power source in various electronically-powered or -assisted devices ("Electronic Device") such as a computer, a camera, a radio or a power tool, various telecommunications devices, or various transportation devices (including a motor vehicle, automobile, truck, bus or airplane).

In another embodiment there is provided a method to prepare an electrolyte composition, the method comprising combining a) an organic carbonate; b) a fluorinated solvent; c) a cyclic sulfate; and d) at least one electrolyte salt; to form an electrolyte composition. The components a), b), c), and d) are as defined herein, and can be combined in any suitable order.

EXAMPLES

The concepts disclosed herein will be further described in the following examples, which do not limit the scope of the invention described in the claims.

The meaning of abbreviations used is as follows: "g" means gram(s), "mg" means milligram(s), "μg" means microgram(s), "L" means liter(s), "mL" means milliliter(s), "mol" means mole(s), "mmol" means millimole(s), "M" means molar concentration, "wt %" means percent by weight, "mm" means millimeter(s), "ppm" means parts per million, "h" means hour(s), "min" means minute(s), "A" means amperes, "mA" mean milliampere(s), "mAh/g" mean milliamperes hour(s) per gram, "V" means volt(s), "xC" refers to a constant current which is the product of x and a current in A which is numerically equal to the nominal capacity of the battery expressed in Ah, "rpm" means revolutions per minute, "NMR" means nuclear magnetic resonance spectroscopy, "GC/MS" means gas chromatography/mass spectrometry, "Ex" means Example and "Comp. Ex" means Comparative Example.

Materials and Methods

Representative Preparation of 2,2-difluoroethyl Acetate

The 2,2-difluoroethyl acetate used in the following Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent 19091S-433, 30 m, 250 μm, 0.25 μm, carrier gas—He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3 A molecular sieves, until water was not detectable by Karl Fischer titration (i.e., <1 ppm).

Representative Preparation of $LiMn_{1.5}NiO_{.45}FeO_{.05}O_4$ Cathode Active Material The following is a typical procedure used to prepare $LiMn_{1.5}Ni_{0.45}Fe_{0.05}O_4$ cathode active material. For the preparation, 401 g manganese (II) acetate tetrahydrate (Aldrich, Milwaukee Wis., Product No. 63537), 125 g nickel (II) acetate tetrahydrate (Aldrich, Product No. 72225) and 10 g iron (II) acetate anhydrous (Alfa Aesar, Ward Hill, Mass., Product No. 31140) were weighed into bottles on a balance, then dissolved in 5.0 L of deionized water. KOH pellets were dissolved in 10 L of deionized water to produce a 3.0 M solution inside a 30 L reactor. The solution containing the metal acetates was transferred to an addition funnel and dripped into the rapidly stirred reactor to precipitate the mixed hydroxide material. Once all 5.0 L of the metal acetate solution was added to the reactor, stirring was continued for 1 h. Then, stirring was stopped and the precipitate was allowed to settle overnight. After settling, the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids were rinsed with deionized water until the filtrate pH reached 6.0 (pH of deionized rinse water), and a further 20 L of deionized water was added to each filter cake. Finally, the cakes were dried in a vacuum oven at 120° C. overnight. The yield at this point was typically 80-90%.

The hydroxide precipitate was ground and mixed with lithium carbonate. This step was done in 50 g batches using a Pulverisette automated mortar and pestle (FRITSCH, Germany). For each batch the hydroxide precipitate was weighed, then ground alone for 5 min in the Pulveresette. Then, a stoichiometric amount with small excess of lithium carbonate was added to the system. For 50 g of hydroxide precipitate, 10.5 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mm in size, and each held about 60 g of material. The firing procedure consisted of ramping from room temperature to 900° C. in 15 h, holding at 900° C. for 12 h, then cooling to room temperature in 15 h.

After firing, the powder was ball-milled to reduce particle size. Then, 54 g of powder was mixed with 54 g of isopropyl alcohol and 160 g of 5 mm diameter zirconia beads inside a polyethylene jar. The jar was then rotated on a pair of rollers for 6 h to mill. The slurry was separated by centrifugation, and the powder was dried at 120° C. to remove moisture.

Representative Cathode Preparation

The following is a typical procedure used to prepare cathodes. The binder was obtained as a 12% solution of polyvinylidene fluoride in NMP (N-methylpyrrolidone, KFL No. 1120, Kureha America Corp. New York, N.Y.). The following materials were used to make an electrode paste: 4.16 g $LiMn_{1.5}Ni_{0.45}Fe_{0.05}O_4$ cathode active powder as prepared above; 0.52 g carbon black (Denka uncompressed, DENKA Corp., Japan); 4.32 g PVDF (polyvinylidene difluoride) solution; and 7.76 g+1.40 g NMP (Sigma Aldrich). The materials were combined in a ratio of 80:10:10, cathode active powder:PVDF:carbon black, as described below. The final paste contained 28.6% solids.

The carbon black, the first portion of NMP, and the PVDF solution were first combined in a plastic vial and centrifugally mixed (ARE-310, Thinky USA, Inc., Laguna Hills, Calif.) two times, for 60 s at 2000 rpm each time. The cathode active powder and the 2nd portion of NMP were added and the paste was centrifugally mixed two times (2×1 min at 2000 rpm). The vial was placed in an ice bath and the rotor-stator shaft of a homogenizer (model PT 10-35 GT, 7.5 mm diameter stator, Kinematicia, Bohemia, N.Y.) was inserted into the vial. The gap between the vial top and the stator was wrapped with aluminum foil to minimize water ingress into the vial. The resulting paste was homogenized for two times for 15 min each at 6500 rpm and then twice more for 15 min at 9500 rpm. Between each of the four homogenization periods, the homogenizer was moved to another position in the paste vial.

The paste was cast using doctor blades with a 0.41-0.51 mm gate height onto aluminum foil (25 µm thick, 1145-0, Allfoils, Brooklyn Heights, Ohio) using an automatic coater (AFA-II, MTI Corp., Richmond, Calif.). The electrodes were dried for 30 min at 95° C. in a mechanical convection oven (model FDL-115, Binder Inc., Great River, N.Y.). The resulting 51-mm wide cathodes were placed between 125 µm thick brass sheets and passed through a calender three times using 100 mm diameter steel rolls at ambient temperature with nip forces increasing in each of the passes, starting at 260 kg with the final pass at 770 kg. Loadings of cathode active material were 7 to 8 $mg/cm^2$.

Anode Preparation

The following is a typical procedure used to prepare anodes. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid: PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 µm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 µm thick brass sheets and passed through a calender three times using 100 mm diameter steel rolls at ambient temperature with nip forces increasing in each of the passes, starting at 260 kg with the final pass at 770 kg. Loadings of anode active material were 3 to 4 $mg/cm^2$.

Coin Cells

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard® Monolayer PP Battery Separator 2500 (Celgard®, Charlotte N.C.). The nonaqueous electrolytes used in the preparation of the coin cells are described in the following Examples.

Comparative Examples 1-7 and Example 1

High Temperature Performance of Coin Cells

The coin cells were cycled twice for formation using a commercial battery tester (Series 4000, Maccor, Tulsa, Okla.) at ambient temperature using constant current charging and discharging between voltage limits of 3.4-4.9 V at a current of 12 mA per gram of cathode active material, which is approximately a 0.1C rate. The coin cells were placed in an oven at 55° C. and cycled using constant current charging and discharging between voltage limits of 3.4-4.9 V at a current of 240 mA per gram of cathode active material, which is approximately a 2C rate.

The results are summarized in Table 1, which provides the solvents and additives used, the coulombic efficiency (CE) measured in the first cycle of formation, CE=(discharge capacity)/(charge capacity), the discharge capacity in the first cycle at 55° C. (D) per gram of cathode active material, the CE in the 10th cycle, and the cycle life at 55° C. The cycle life was measured as the number of cycles required to reduce the discharge capacity to 80% of the capacity measured in the 2nd cycle of cycling at 55° C.

In Example 1, the electrolyte was a mixture of 29.5 wt % ethylene carbonate (EC), 69.5 wt % 2,2-difluoroethyl acetate (DFEA) with 1M LiPF$_6$ (BASF, Independence, Ohio) and 1.0 wt % ethylene sulfate (Sigma-Aldrich, St. Louis, Mo.).

In Comparative Example 1, the electrolyte was a mixture of 30.0 wt % EC and 70 wt % ethyl methyl carbonate (EMC, BASF, Independence, Ohio) with 1M LiPF$_6$.

In Comparative Examples 2 through 7, the electrolytes were a mixture of 29.5 wt % ethylene carbonate (EC), 69.5 wt % 2,2-difluoroethyl acetate (DFEA) with 1M LiPF$_6$ and 1.0 wt % additive as listed in Table 1 below.

The results shown in Table 1 demonstrate that the electrolytes containing either no additive or 1 wt % of either dimethyl sulfite (Aldrich), diethyl sulfate, ethylene sulfite, 1,2-propylene sulfite, or 1,3-propylene sulfate have poor cycle life (4 to 55 cycles to T80). However, the combination of DFEA/EC with the cyclic sulfate ethylene sulfate shows an unexpected result. Lifetime is significantly enhanced for the cell containing the electrolyte of Example 1 as compared to the comparative cells containing electrolyte with either no additive or other sulfur containing additives—a 2.4 to 31 times improvement, comparing the highest cycle life of Example 1(135) to the highest cycle life (55) of the comparative examples, and the lowest cycle life of Example 1 (125) to the lowest cycle life (4) of the comparative examples, respectively.

TABLE 1

Results for Comparative Examples 1-7 and Example 1

| Example | Solvents | Additive at 1 wt % | CE 1$^{st}$ Cycle Formation (%) | D Capacity 1$^{st}$ cycle, 55° C. | CE 10$^{th}$ Cycle (%) | Cycle Life 55° C., T80 |
|---|---|---|---|---|---|---|
| Comp. Ex. 1 | EMC/EC | None | 78.9 | 115 | 98.52 | 55 |
| Comp. Ex. 2 | DFEA/EC | None | 67.6 | 108 | 97.39 | 22 |
| | | | 64.2 | 101 | 94.93 | 13 |
| | | | 64.1 | 102 | 94.69 | 14 |
| Comp. Ex. 3 | DFEA/EC | Dimethyl sulfite | 25.82 | 38 | 82.48 | 6 |
| | | | 81.43 | 56 | 87.85 | 13 |
| Comp. Ex. 4 | DFEA/EC | Diethyl sulfate | 90.81 | 80 | 96.22 | 28 |
| | | | 92.89 | 102 | 97.30 | 27 |
| | | | 90.01 | 87 | 96.47 | 17 |
| Comp. Ex. 5 | DFEA/EC | Ethylene sulfite | 8.34 | 28 | 71.27 | 7 |
| | | | 11.81 | 48 | 88.61 | 11 |
| | | | 17.18 | 23 | 81.68 | 13 |
| Comp. Ex. 6 | DFEA/EC | 1,2-Propylene sulfite | 85.35 | 68 | 95.58 | 8 |
| | | | 64.67 | 39 | 94.12 | 16 |
| | | | 47.74 | 23 | 83.15 | 4 |
| Comp. Ex. 7 | DFEA/EC | 1,3-Propylene sulfate | 85.35 | 68 | 95.58 | 8 |
| | | | 64.67 | 39 | 94.12 | 16 |
| | | | 47.74 | 23 | 83.15 | 4 |
| Ex. 1 | DFEA/EC | Ethylene sulfate | 78.60 | 99 | 98.72 | 125 |
| | | | 80.29 | 100 | 98.56 | 135 |

Examples 2 and 3

Cathode Preparation

Preparation of Primer on Aluminum Foil Current Collector—Using a Polyimide/Carbon Composite To prepare the polyamic acid, a prepolymer was first prepared. 20.6 wt % of PMDA:ODA prepolymer was prepared using a stoichiometry of 0.98:1 PMDA/ODA (pyromellitic dianhydride/ODA (4,4'-diaminodiphenyl ether) prepolymer). This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the molar ratio of the anhydride to the amine component was approximately 0.98:1.

In a separate container, a 6 wt % solution of pyromellitic anhydride (PMDA) was prepared by combining 1.00 g of PMDA (Aldrich 412287, Allentown, Pa.) and 15.67 g of NMP (N-methylpyrrolidone). 4.0 grams of the PMDA solution was slowly added to the prepolymer and the viscosity was increased to approximately 90,000 poise (as measured by a Brookfield viscometer—#6 spindle). This resulted in a finished prepolymer solution in which the calculated final PMDA:ODA ratio was 1.01:1.

5.196 Grams of the finished prepolymer was then diluted with 15.09 grams of NMP to create a 5 wt % solution. In a vial, 16.2342 grams of the diluted finished prepolymer solution was added to 0.1838 grams of TimCal Super C-65 carbon black. This was further diluted with 9.561 grams of NMP for a final solids content of 3.4 wt %, with a 2.72 prepolymer:carbon ratio. A Paasche VL#3 Airbrush sprayer (Paasche Airbrush Company, Chicago, Ill.) was used to spray this material onto the aluminum foil (25 µm thick, 1145-0, Allfoils, Brooklyn Heights, Ohio). The foil was weighed prior to spraying to identify the necessary coating to reach a desired density of 0.06 mg/cm$^2$. The foil was then smoothed onto a glass plate, and sprayed by hand with the airbrush until coated. The foil was then dried at 125° C. on a hot plate, and measured to ensure that the desired density was reached. The foil was found to be coated with 0.06 mg/cm$^2$ of the polyamic acid. Once the foil was dried and at the desired coating, the foil was imidized at 400° C. following the imidization procedure below 40° C. to 125° C. (ramp at 4° C./min)
125° C. to 125° C. (soak 30 min)
125° C. to 250° C. (ramp at 4° C./min)
250° C. to 250° C. (soak 30 min)
250° C. to 400° C. (ramp at 5° C./min)
400° C. to 400° C. (soak 20 min)

Coating of the Cathode Electroactive Layer onto the Primed Al Foil

Preparation of the Paste

The binder used was a Solef® 5130 (Solvay, Houston, Tex.) binder that was diluted to a 5.5% solution in NMP (N-methylpyrrolidone, Sigma Aldrich, St. Louis, Mo.). The following materials were used to make an electrode paste: 6.0352 g Farasis 1,1,1 NMC (Ni, Mn, Co, Farasis Energy, Hayward, Calif.) cathode active powder; 0.3342 g carbon black (Denka uncompressed, DENKA Corp., Japan); 6.0971 g PVDF (polyvinylidene difluoride (Solef® 5130) diluted with 2.1491 g NMP (portion 1)+0.3858 g NMP (portion 2) (Sigma Aldrich). The materials were combined in a ratio of 90:5:5, cathode active powder:PVDF:carbon black, as described below. The final paste contained 44.7 wt % solids.

The carbon black, the first portion of NMP, and the PVDF solution were first combined in a plastic THINKy container and centrifugally mixed (ARE-310, Thinky USA, Inc., Laguna Hills, Calif.) for 2 minutes at 2000 rpm. The cathode active powder and the $2^{nd}$ portion of NMP were added and the paste was centrifugally mixed once again at 2000 rpm for 2 minutes. An ultrasonic horn was immersed into the paste and ultrasonic energy was applied for approximately three seconds.

The aluminum foil (25 μm thick, 1145-0, Allfoils, Brooklyn Heights, Ohio) was pretreated with a polyimide/carbon primer as described above.

Coating and Calendering the Cathode Electrode

The paste was manually cast using doctor blades with a 5 mil gate height plus 2 mil of Kapton® tape to produce a total gate opening of 7 mils onto the primed aluminum foil. The electrodes were dried for 60 minutes at 90° C. in a vacuum oven. The resulting 51-mm wide cathodes were placed between 125 mm thick brass sheets and passed through a calendar three times using 100 mm diameter steel rolls at 125° C. with pressure increasing in each pass, at pressures of 18 psi, 24 psi, and 30 psi. The calendar was set to have a nip force (in lb)=37.8×regulator pressure (psi). Loadings of cathode active material were approximately 7.57-8.0 mg/cm².

Anode Preparation

The following is a typical procedure used for the preparation of the anodes used in the Examples herein. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid:PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg.

The loading of the anode active component was approximately 4.2-4.4 mg/cm².

Electrolyte Preparation

For Example 2, the electrolyte was prepared by combining 70 weight % of DFEA and 30 wt % EC in a nitrogen purged drybox. Molecular sieves (3 A) were added and the mixture was dried to less than 1 ppm water. After filtration with a 0.25 micron PTFE syringe filter, $LiPF_6$ was added to make the formulated electrolyte at 1 M concentration. 2.9401 Grams of this mixture was combined with 0.06001 g of ethylene sulfate to prepare the formulated electrolyte.

For Example 3, the electrolyte was prepared by combining 70 weight % of DFEA and 30 wt % EC in a nitrogen purged drybox. Molecular sieves (3 A) were added and the mixture was dried to less than 1 ppm water. After filtration with a 0.25 micron PTFE syringe filter, $LiPF_6$ was added to make the formulated electrolyte at 1 M concentration. 2.7004 Grams of this mixture was combined with 0.30031 g of ethylene sulfate to prepare the formulated electrolyte.

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.).

Coin Cell Evaluations at 25° C.

The coin cells were cycled twice for formation using a commercial battery tester (Series 4000, Maccor, Tulsa, Okla.) at ambient temperature using constant current charging and discharging between voltage limits of 3.0-4.6 V at a current of 17.5 mA per gram of cathode active material, which is approximately a 0.1C rate. Following this procedure, the coin cells were cycled using constant current charging and discharging between voltage limits of 3.0-4.6 V at a current of 87.5 mA per gram of cathode active material, which is approximately a C/2 rate. During each charge step, the voltage was subsequently held at 4.6 V until the current tapered to C/20 (approximately 8.75 mA per gram of active cathode material). The results are shown below in Table 2.

TABLE 2

Results for Example 2 and Example 3 at 25° C.

| Example | Electrolyte | Cycle Life 80% |
|---|---|---|
| Ex. 2 | DFEA/EC + 2% ethylene sulfate | 62 |
|  |  | 72 |
|  |  | 86 |
| Ex. 3 | DFEA/EC + 10 wt % ethylene sulfate | 34 |
|  |  | 57 |
|  |  | 34 |

Comparative Examples 8-13

Examples 4 and 5

Pouch Cells

For Comparative Examples 8 through 13 and for Examples 4 and 5, the cathode paste was made using the following materials:
- 0.52 g carbon black (Super C65, Timcal, Westlake, Ohio)
- 10.4 g solution of 5% pVDF (Solef 5130, Solvay, West Deptford, N.J.) in N-methylpyrrolidone (NMP, Sigma-Aldrich, Milwaukee, Wis.)
- 3.0 g NMP
- 9.36 g NMC 532 (approx. $LiNi_{0.5}Mn_{0.3}CO_{0.2}O_2$, Jinhe Ningbo, China)

The carbon black, PVDF solution, and NMP were first combined in a plastic vial and centrifugally mixed (ARE-310, Thinky USA, Inc., Laguna Hills, Calif.) two times for 60 s at 2000 rpm each time. The cathode active powder was added and the paste was centrifugally mixed two times (2×1 min at 2000 rpm). The paste was further mixed using a rotor-stator homogenizer (model PT 10-35 GT, 9 mm diameter rotor, Kinematicia, Bohemia, N.Y.). The paste was homogenized for 5 min at 9500 rpm. During this time the vial was moved to bring the various portions of the paste into contact with the homogenizer rotor blade. Bubbles were removed using the centrifugal mixer. The paste was cast using a doctor blade (102 mm wide×0.29 mm gate height, Bird Film Applicator Inc., Norfolk, Va.) onto aluminum foil (25 μm thick, 1145-0, Allfoils, Brooklyn Heights, Ohio) using an electric-drive coater (Automatic Drawdown Machine II, Paul N. Gardner Co., Pompano Beach, Fla.). The electrodes were dried for 30 min in a mechanical convection oven (model FDL-115, Binder Inc., Great River, N.Y.). The temperature in the oven was increased from 80° C. to 100° C. during the first 15 min, and held at 100° C. for the second 15 minutes. After drying the composition of the cathode was 90:5:5 wt:wt:wt NMC:pVDF:black. The cathode was placed between brass cover sheets and calendered between 100 mm diameter steel rolls to give 57 μm thick cathodes with porosity of approximately 33% and loading of 14 mg NMC/cm². Anodes were graphite:pVDF:carbon black (88:7:5 wt:wt:wt) coated on a copper foil current collector. The graphite was G5 (CPreme® G5, Conoco-Philips, Huston, Tex.); the carbon black was C65. The anode coating weight was 7.8 mg graphite/cm² and the anodes were calendered to a thickness of 75 μm.

Pouch cells: Cathodes were punched out to 31.3×45 mm² size and anodes were punched out to 32.4×46.0 mm². Al and Ni tabs were ultrasonically welded to the current collectors, and single-layer pouch cells were assembled using a foil-polymer laminate pouch material (C4-480ST, Showa Denko Packaging Corp, Osaka, Japan). The tabs were sealed into the top of the pouch outside the dry box, leaving the two sides and bottom open. The pouch was dried in the antechamber of a dry box under vacuum overnight at 90° C. Inside the argon-filled dry box, a microporous polyolefin separator (Celgard 2500, Charlotte, N.C.) was placed between the anode and cathode, and the sides sealed. The electrolyte (350 μl) was injected through the bottom, and the bottom edge sealed in a vacuum sealer.

Evaluation procedure: The cells were placed in fixtures which applied a pressure of 320 kPa to the electrodes through an aluminum plate fitted with a foam pad. The cells were held in a 25° C. environmental chamber and evaluated using a battery tester (Series 4000, Maccor, Tulsa, Okla.). In the following procedure, the currents for the C-rates were determined assuming the cell would have a capacity of 170 mAh per g of NMC. Thus currents of 0.05C, 0.25C, and 1.0C were implemented in the tester using, respectively, currents of 8.5, 42.5, and 170 mA per gram of NMC in the cell.

The steps of the procedure were as follows:
1. Overnight wetting at open circuit (OC)
2. 1st charge
3. Aging at OC
4. Bring cell in dry box, open to release formation gas, vacuum reseal
5. Finish remainder of 1st charge
6. Discharge CC at 0.5C to 3.0V
7. 2nd Cycle: Charge CC of 0.2C to 4.35V+CV to 0.05C: Discharge CC at 0.2C to 3.0V The $2^{nd}$ cycle discharge capacity is the Initial Capacity in Ah.
8. 3th-6th cycles: Charge CC at 170 mA/g~1C to 4.35V+CV to 8.5 mA/g; Discharge CC at 1.0C to 3.0V
9. 7rd Charge CC at 1.0C 4.35V+CV to 0.05C
10. Demount from the fixture; Measure the volume of the cell after formation (VF)
11. Store cell at 90° C. for 4 h
12. Measure cell volume after storage (VS); The gas generated during storage was calculated as GS=VS−VF, the gas generated during storage, normalized for cell capacity was calculated as GS/Ah=GS/Initial Capacity (units cc/Ah)

Cell Volume Measurement: A rectangular beaker (typically 130×27×75 mm H×W×L) was filled with propylene carbonate (PC, density of fluid df=1.204 g/cc), the beaker was placed on a balance of 0.001 g resolution equipped with a draft shield and located in a chemical fume hood, and the balance tared. A thin thread was attached to the cell with a small piece of Kapton® adhesive tape, the cell suspended (fully immersed) in the PC, and the mass reading of the suspended cell was recorded, ms. For the cell of volume V immersed in a fluid of density df, the fluid exerted an upward buoyant force ms on the cell, which was transmitted to the balance pan as force ms. The volume of the cell V was calculated using Archimedes principle as V=ms/df.

Table 3 below shows the discharge capacity in the second cycle and the volume of gas generated during storage for a series of electrolyte formulations. Comparative Examples 8-13, Example 4, and Example 5 used a $LiPF_6$/EC/DFEA base electrolyte (1 M $LiPF_6$ in a solvent mixture of 30 wt % EC, 70 solvent wt % DFEA) with specified weight percentages of additives as indicated in Table 3. 1,3-Propane sultone, succinic anhydride, and ethylene sulfate (1,3,2-dioxathiolane, 2,2-dioxide) and were obtained from Sigma-Aldrich Co., St. Louis, Mo., and were purified by sublimation. Vinylene carbonate (Sigma-Aldrich Co.) had its BHT inhibitor removed by passing the vinylene carbonate through a short column of alumina.

TABLE 3

Results for Comparative Examples 8-13 and Example 4 and Example 5

| Example | Additive and Amount | 2nd Cycle Discharge Capacity mAh/g | Gas Generation 90° C. 4 h cc/Ah |
|---|---|---|---|
| Comp. Ex. 8 | 2% 1,3-propane sultone | 165.0 | 8.4 |
| Comp. Ex. 9 | 2% 1,3-propane sultone | 164.7 | 8.2 |
| Comp. Ex. 10 | 2% vinylene carbonate | 167.7 | 3.5 |
| Comp. Ex. 11 | 2% vinylene carbonate | 167.1 | 3.7 |
| Comp. Ex. 12 | 2% succinic anhydride | 168.7 | 1.0 |
| Comp. Ex. 13 | 2% succinic anhydride | 167.9 | 1.1 |
| Ex. 4 | 2% ethylene sulfate | 176.8 | 0.49 |
| Ex. 5 | 2% ethylene sulfate | 176.6 | 0.77 |

The results in Table 3 demonstrate that the specific discharge capacity in the second discharge cycle was the highest, and the gas generation the lowest, for pouch cells of Example 4 and Example 5, which contained the electrolyte composition with the cyclic sulfate additive. In contrast, the pouch cells of Comparative Examples 8 through 13, which contained the same $LiPF_6$/EC/DFEA base electrolyte but different additives (at the same weight percent loading), had lower specific discharge capacity in the second discharge cycle and higher gas generation. The results for Examples 4 and 5 indicate a more efficient formation process which minimizes loss of active lithium during the first two cycles for the electrolyte composition containing the cyclic sulfate.

What is claimed is:

1. An electrolyte composition comprising:
   a) an organic carbonate selected from ethylene carbonate and/or propylene carbonate;
   b) a fluorinated acyclic carboxylic acid ester selected from $CH_3—COO—CH_2CF_2H$;
   c) a cyclic sulfate selected from one of ethylene sulfate or propylene sulfate; and
   d) at least one electrolyte salt;
   wherein the electrolyte composition comprises about 0.5 weight percent to about 3 weight percent of the cyclic sulfate.

2. The electrolyte composition of claim 1, further comprising lithium bis(oxalate)borate or fluoroethylene carbonate.

3. The electrolyte composition of claim 1, wherein the organic carbonate is ethylene carbonate, and the cyclic sulfate is ethylene sulfate.

4. An electrochemical cell comprising:
   (a) a housing;
   (b) an anode and a cathode disposed in said housing and in ionically conductive contact with one another;
   (c) the electrolyte composition of claim 1 disposed in said housing and providing an ionically conductive pathway between said anode and said cathode; and
   (d) a porous separator between said anode and said cathode.

5. The electrochemical cell of claim 4, wherein said electrochemical cell is a lithium ion battery.

6. The electrochemical cell of claim 4, wherein the anode is lithium titanate or graphite.

7. The electrochemical cell of claim 4, wherein the cathode comprises a cathode active material exhibiting greater than 30 mAh/g capacity in the potential range greater than 4.6 V versus a Li/Li$^+$ reference electrode.

8. The electrochemical cell of claim 4, wherein the cathode comprises a cathode active material which is charged to a potential greater than or equal to 4.35 V versus a Li/Li+ reference electrode.

9. The electrochemical cell of claim 4, wherein the cathode comprises a lithium-containing manganese composite oxide having a spinel structure as active material, the lithium-containing manganese composite oxide being represented by the formula:

$$Li_xNi_yM_zMn_{2-y-z}O_{4-d},$$

wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3.

10. The electrochemical cell of claim 4, wherein the cathode comprises $$Li_aNi_bMn_cCO_dR_eO_{2-f}Z_f, \text{ wherein:}$$

R is Al, Ni, Co, Mn, Cr, Fe, Mg, Sr, V, Zr, Ti, a rare earth element, or a combination thereof, and Z is F, S, P, or a combination thereof; and
0.8≤a≤1.2, 0.1≤b≤0.5, 0.2≤c≤0.7, 0.05≤d≤0.4, 0≤e≤0.2; wherein the sum of b+c+d+e is about 1; and 0≤f≤0.08.

11. The electrochemical cell of claim 4, wherein the cathode comprises $$Li_aA_{1-b}R_bD_2, \text{ wherein:}$$

A is Ni, Co, Mn, or a combination thereof; R is Al, Ni, Co, Mn, Cr, Fe, Mg, Sr, V, Zr, Ti, a rare earth element, or a combination thereof, and D is 0, F, S, P, or a combination thereof; and
0.90≤a≤1.8 and 0≤b≤0.5.

12. The electrochemical cell of claim 4, wherein the cathode comprises a composite material represented by the structure of Formula:

$$x(Li_{2-w}A_{1-v}Q_{w+v}O_{3-\theta})*(1-x)(Li_yMn_{2-z}M_zO_{4-d})$$

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5;
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_1$-$vO_{3-e}$ component has a layered structure.

13. An electronic device, transportation device, or telecommunications device, comprising an electrochemical cell according to claim 4.

14. A method comprising:
    combining:
    a) an organic carbonate selected from ethylene carbonate and/or propylene carbonate;
    b) a fluorinated acyclic carboxylic acid ester selected from $CH_3—COO—CH_2CF_2H$;
    c) a cyclic sulfate selected from ethylene sulfate or propylene sulfate; and
    d) at least one electrolyte salt;

to form an electrolyte composition;
wherein the electrolyte composition comprises about 0.5 weight percent to about 3 weight percent of the cyclic sulfate.

15. The method of claim 14, wherein the organic carbonate is ethylene carbonate, and the cyclic sulfate is ethylene sulfate.

16. The electrolyte composition of claim 1, wherein the organic carbonate is ethylene carbonate.

17. The method of claim 14, wherein the organic carbonate is ethylene carbonate.

* * * * *